US007415260B2

(12) United States Patent
Stockstad et al.

(10) Patent No.: US 7,415,260 B2
(45) Date of Patent: Aug. 19, 2008

(54) CURRENT-MODE DIRECT CONVERSION RECEIVER

(75) Inventors: Troy L. Stockstad, Chandler, AZ (US); Klaas Wortel, Phoenix, AZ (US); Luis J. Briones, Chandler, AZ (US); David Lovelace, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 529 days.

(21) Appl. No.: 10/795,740

(22) Filed: Mar. 8, 2004

(65) Prior Publication Data

US 2005/0197090 A1    Sep. 8, 2005

(51) Int. Cl.
    *H04B 1/00*    (2006.01)
(52) U.S. Cl. ........................... 455/312; 455/324
(58) Field of Classification Search ......... 455/313–315, 455/317, 323, 324, 333, 334, 296, 308–310, 455/311–312
    See application file for complete search history.

(56) References Cited

U.S. PATENT DOCUMENTS

| 4,156,283 | A |   | 5/1979  | Gilbert |
| 4,521,892 | A | * | 6/1985  | Vance et al. ............... 375/334 |
| 6,703,894 | B1 |  | 3/2004  | Stockstad et al. |
| 6,957,057 | B2 | * | 10/2005 | Das ............................ 455/333 |
| 6,999,745 | B2 | * | 2/2006  | Leenaerts ................... 455/313 |
| 2004/0147240 | A1 | * | 7/2004 | Igarashi et al. .............. 455/302 |
| 2006/0057989 | A1 | * | 3/2006 | Wu ........................... 455/190.1 |

OTHER PUBLICATIONS

Parssinen, J., et al., "A 2-GHz Wide-Band Direct Conversion Receiver for WCDMA Applications," IEEE Journal of Solid-State Circuits, Dec. 1999, pp. 1893-1903, vol. 34, No. 12.

* cited by examiner

*Primary Examiner*—Nguyen Vo
(74) *Attorney, Agent, or Firm*—Meyertons Hood Kivlin Kowert & Goetzel, P.C.; Jeffrey C. Hood

(57) ABSTRACT

A current-mode direct conversion RF receiver is presented. In one set of embodiments the RF receiver comprises a simple transconductor input stage to create a current-mode modulated signal from a voltage-mode modulated signal. A downconversion mixer may be coupled to the transconductor input stage via a low impedance current cascode stage, and may operate to create a set of current-mode quadrature baseband signals from the current-mode modulated signal. The downconversion mixer may be implemented with a transistor-switching network, which may be driven by a phase locked loop (PLL) with quadrature outputs. The set of current-mode quadrature baseband signals may be converted back to the voltage domain by a transimpedance filter, which may perform channel selection for the receiver. The transimpedance filter may additionally include a low frequency zero to remove DC offsets. The receiver may be implemented using CMOS design technologies and operated with minimal self-mixing effects, minimal DC offset in the baseband signal, and utilizing low voltages.

36 Claims, 4 Drawing Sheets

CURRENT-MODE DIRECT CONVERSION RECEIVER

BACKGROUND OF THE INVENTION

1. Field of the Invention

This invention relates generally to the field of wireless electronic equipment design and, more particularly, to radio frequency (RF) receiver design.

2. Description of the Related Art

A traditional narrow band radio system's receiver portion is generally used for translating a modulated radio frequency (RF) carrier to a low frequency, or baseband, signal, which may then be demodulated to extract an original modulating signal. A primary function of an RF receiver is best described as a "down conversion", or "mixing", of an RF modulated carrier to a baseband signal, and a filtering of the down converted signal to remove any artifacts that may have arisen as part of the mixing process. Due to the image effects that may occur during the mixing process, performing down conversion may be handled in multiple stages where two or more down conversion stages may be applied in series. A traditional super-heterodyne receiver often uses two down conversions stages separated by channel filtering to remove any effects from image frequencies. These channel filters have traditionally been implemented with external components due to the frequency and accuracy requirements of the receiver. Often some additional gain is also used before down converting the input RF signal as the mixing process typically adds noise to the baseband signal.

Down conversion mixers have traditionally been implemented with Gilbert mixers (as described in U.S. Pat. No. 4,156,283), which are voltage input, voltage output circuits that require large supply voltages. A large supply voltage limits the ability of RF receivers to operate from portable supply voltages, for example a battery, which limits their ease of use. Additionally, low noise amplifier (LNA) gain stages used at the input of RF receivers generally require large supply voltages in order to maintain proper isolation from their inputs.

One RF receiver topology that has generated significant interest and research activity is "direct conversion" receivers. Direct conversion receivers typically mix the modulated input RF signal directly to a baseband signal with a single mixing stage. The advantage of this topology is that the image-reject filters of the super-heterodyne receivers are no longer required, which generally translates into reduced cost. Disadvantages of direct conversion receivers include non-ideal effects like DC offsets in the baseband signal and self-mixing with the local oscillator to the RF input due to finite isolation. In the past, these problems were generally difficult to overcome, which is one main reason why a majority of RF receivers have been designed as a variation on the super-heterodyne architecture.

One example of a direct conversion receiver design is found in "A 2 GHz Wide-Band Direct Conversion Receiver for WCDMA Applications", IEEE JSSC vol. 34, no. 12 December 1999. The receiver described in the above cited publication uses a voltage mode LNA at the front end, a Gilbert cell down-conversion mixer, and a voltage mode Butterworth channel selection filter. Typically, most direct conversion receiver architectures use at least one stage of voltage mode circuitry. Generally, direct conversion receivers to this point have relied on tried and true LNA and mixer topologies that are inherently voltage mode circuits. These architectures typically require significantly higher supply voltages than alternative current mode architectures, especially in case of Complementary Metal-Oxide Semiconductor (CMOS) circuits.

SUMMARY OF THE INVENTION

In one set of embodiments the invention proposes a system and method for designing and building a current-mode direct conversion RF receiver that operates with minimal self-mixing effects, minimal DC offset in the baseband signal, and utilizes low voltages, by employing a direct conversion receiver with a simple input transconductance stage, or voltage-to-current conversion stage, to create a current-mode RF modulated signal. The input transconductor of the input transconductance stage may be isolated from a down conversion mixer, which may be used to generate quadrature baseband signals corresponding to the input RF signal, by a low impedance current cascode stage to minimize self-mixing effects. The down conversion mixer may be implemented with a transistor-switching network, which may be driven by a phase locked loop (PLL) with quadrature outputs. The receiver may be implemented using CMOS design technologies at low voltages. The final quadrature baseband signals may be converted back to the voltage domain by a transimpedance filter, which may perform channel selection for the receiver. The baseband filter may additionally include a low frequency zero to remove DC offsets. Pursuant to the above, all analog signal processing may take place in the current domain, with the only voltage nodes configured at the input of the input transconductance stage and the baseband filter outputs.

In one embodiment, the current-mode direct conversion receiver includes an input transconductance stage that converts the input RF signal into a current mode signal. The input transconductor replaces the traditional voltage-mode low noise amplifier (LNA) of conventional RF receivers. A high impedance output of the input transconductor may be connected to a very low input impedance current cascode stage. The current cascode stage may feed into a down conversion mixer stage, which may generate quadrature current outputs. In one embodiment, the current cascode stage is constructed with common source transistors in a feedback loop and may operate to minimize the input impedance (and voltage perturbations) seen at the current cascode inputs. Overall, the current cascode stage may operate to isolate the RF input from any voltage changes seen due to the down conversion mixer stage, in order to minimize self-mixing with the input signal.

Because the modulated RF signal is a current-mode signal, in some embodiments the mixer may be constructed from simple single transistor switches, well suited for CMOS implementations. In one embodiment the mixer may be implemented with just eight NMOS switches, which may be driven with CMOS logic level signals from a phase locked loop (PLL). The quadrature baseband currents may then be fed to a transimpedance filter, which may reconstruct the modulated signal in voltage mode at low frequency. The transimpedance filter eliminates unwanted signals in adjacent channels. In one embodiment, the voltage-mode filter output is fed into a demodulator to extract the wanted transmitted information.

Thus, various embodiments of the invention may provide a means for designing a current-mode direct conversion RF receiver that operates with minimal DC offset in the baseband signal, minimizes self-mixing effects, and utilizes low voltages.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
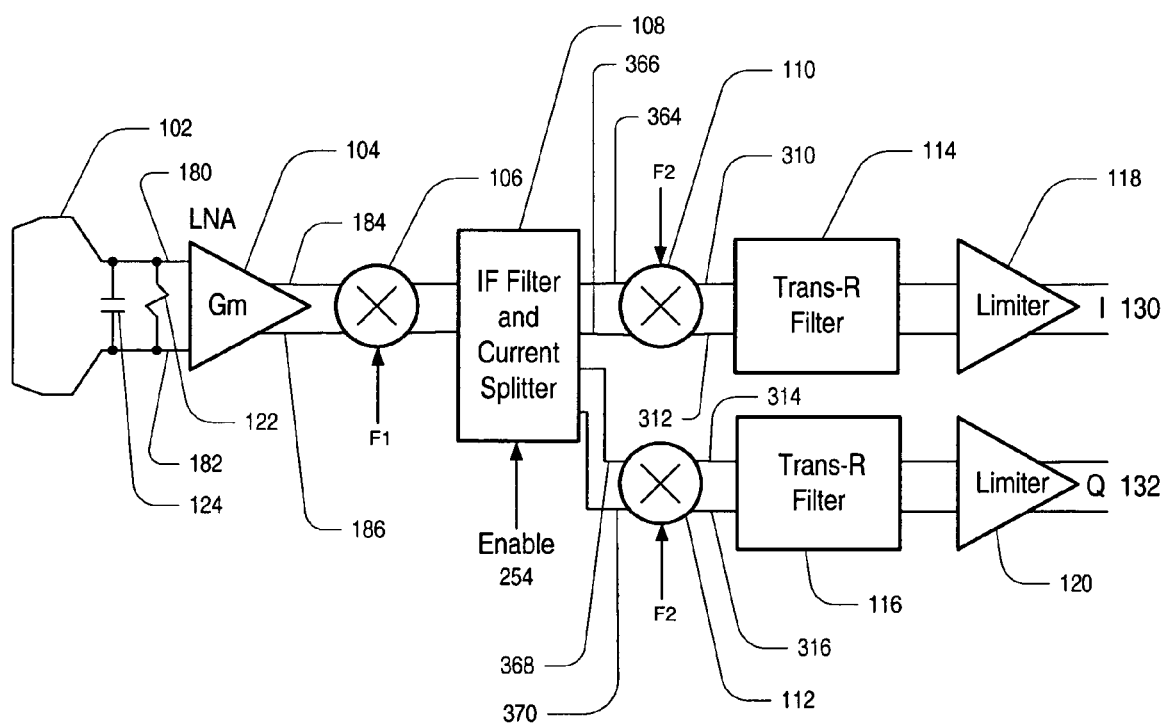
FIG. 1 illustrates a current-mode direct conversion receiver implemented in accordance with one set of embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, when referencing a pulse of a signal, a "leading edge" of the pulse is a first edge of the pulse, resulting from the value of the signal changing from a default value, and a "trailing edge" is a second edge of the pulse, resulting from the value of the signal returning to the default value. A "data-valid window" for a signal represents a time period during which the signal may be considered a valid digital signal. A first signal is said to be "corresponding" to a second signal if the first signal was generated in response to the second signal. A first signal is said to "propagated based on" a second signal, when the second signal controls the propagation of the first signal. Similarly, a first module is said to "use" a clock signal to transfer data to a second module, when propagation of the data from the first module to the second module is controlled and/or triggered by the clock signal.

FIG. 1 illustrates a receiver architecture implemented in accordance with one set of embodiments of the present invention. In the embodiment shown in FIG. 1, an antenna 102, which is operable to receive an input RF signal, is coupled to an input transconductance stage (ITC) 104 via capacitor 124 and resistor 122. While some antennas may require the presence of capacitor 124 and resistor 122 in order to exhibit the desired characteristics, other antennas may operate as required without either capacitor 124 and/or resistor 122. ITC 104 functions as a voltage-to-current converter and operates to create a current-mode RF modulated signal. ITC 104 may be coupled to an intermediate mixer 106, which may receive the current-mode RF modulated signal created by input transconductance stage 104. The output of intermediate mixer 106 may be provided to an intermediate filter and current splitter (IFC) 108, which may then be coupled to a down conversion mixer stage comprising quadrature mixers 110 and 112, respectively, and transimpedance filters (TRF) 114 and 116, respectively.

In direct conversion receiver architectures where the local oscillator mixes with an incoming RF signal and transforms the incoming RF signal directly to baseband, any leakage of the local oscillator into the RF signal ports may potentially drown out the RF signal itself. Furthermore, such leakage may also result in the local oscillator mixing with itself, which may additionally lead to a DC offset at the baseband signal depending on phase differences. Larger frequencies of the incoming RF signal may facilitate leaks of the local oscillator throughout the receiver circuit.

In the embodiment shown in FIG. 1, first mixer 106 operates to reduce the input frequency of the carrier of the input RF signal, by mixing the current-mode RF modulated signal at nodes 184 and 186 with frequency F1 down to an intermediate frequency. Frequency F1 may be provided by a local oscillator. Intermediate mixer 106 substantially alleviates the leakage problem described in the previous paragraph by mixing the current-mode modulated RF signal at nodes 184 and 186 to the lower intermediate frequency F1. For filtering out residual, but no longer operational frequencies, IFC 108 may be applied to the output of intermediate mixer 106. IFC 108 may also operate to split the intermediate frequency signals to provide respective differential input pairs 364 and 366, and 368 and 370 to quadrature mixers 110 and 112, respectively. In the embodiment shown in FIG. 1, processing through intermediate mixer 106 and IFC 108 also take place in the current domain as opposed to the voltage domain. Those skilled in the art will appreciate that while the embodiment shown in FIG. 1 includes an intermediate mixer and intermediate filter, alternate embodiments may be realized without an intermediate mixer and/or an intermediate filter, and input transconductance stage 104 may be coupled to quadrature mixers 110 and 112 in a variety of ways.

Mixer 110 and mixer 112 together may operate to create quadrature current outputs through mixing the current-mode RF modulated signal with frequency F2, which may be provided by a local oscillator. In one embodiment, the quadrature current outputs are provided to TRF 114 and TRF 116, respectively. TRF 114 and TRF 116 together may operate to reconstruct the modulated signal—which was comprised in the input RF signal—as voltage-mode quadrature signals at low frequency. In one embodiment the receiver may be part of a radio link system using several channels spaced apart in frequency. While one of those channels is being accessed all other channels may need to be filtered out in order to prevent interference. Therefore, TRF 114 and TRF 116 may also operate to attenuate any signal outside the signals corresponding to the input RF signal by removing unwanted signals in adjacent channels comprised in the radio link system.

In one set of embodiments, for example when performing phase demodulation, the voltage-mode quadrature signals may each be fed into a respective limiter amplifier, where the output of limiter amplifier 118 may provide as its output the I-channel quadrature signal (I) 130 and limiter amplifier 120 may provide as its output the Q-channel quadrature signal (Q) 132. I 130 and Q 132 may be provided to a demodulator to extract the desired transmitted information. Limiter amplifiers 118 and 120 may operate to amplify the voltage-mode quadrature signals such that they saturate against a supply voltage Vcc and Ground, thus providing a more ideal input into the demodulator to process the signals in the digital domain. In embodiments where an FSK demodulator is used, limiter amplifiers 118 and 120 may also operate to limit the voltage-mode quadrature signals to eliminate interference from amplitude modulated (AM) sources that may be feeding into the receiver through the front-end. While certain embodiments may preferably include limiter amplifiers, in other embodiments limiter amplifiers 118 and 120 may be omitted, and the voltage-mode quadrature signals generated by TRF 114 and TRF 116 may be provided as I 130 and Q 132, respectively.

Figure 2:
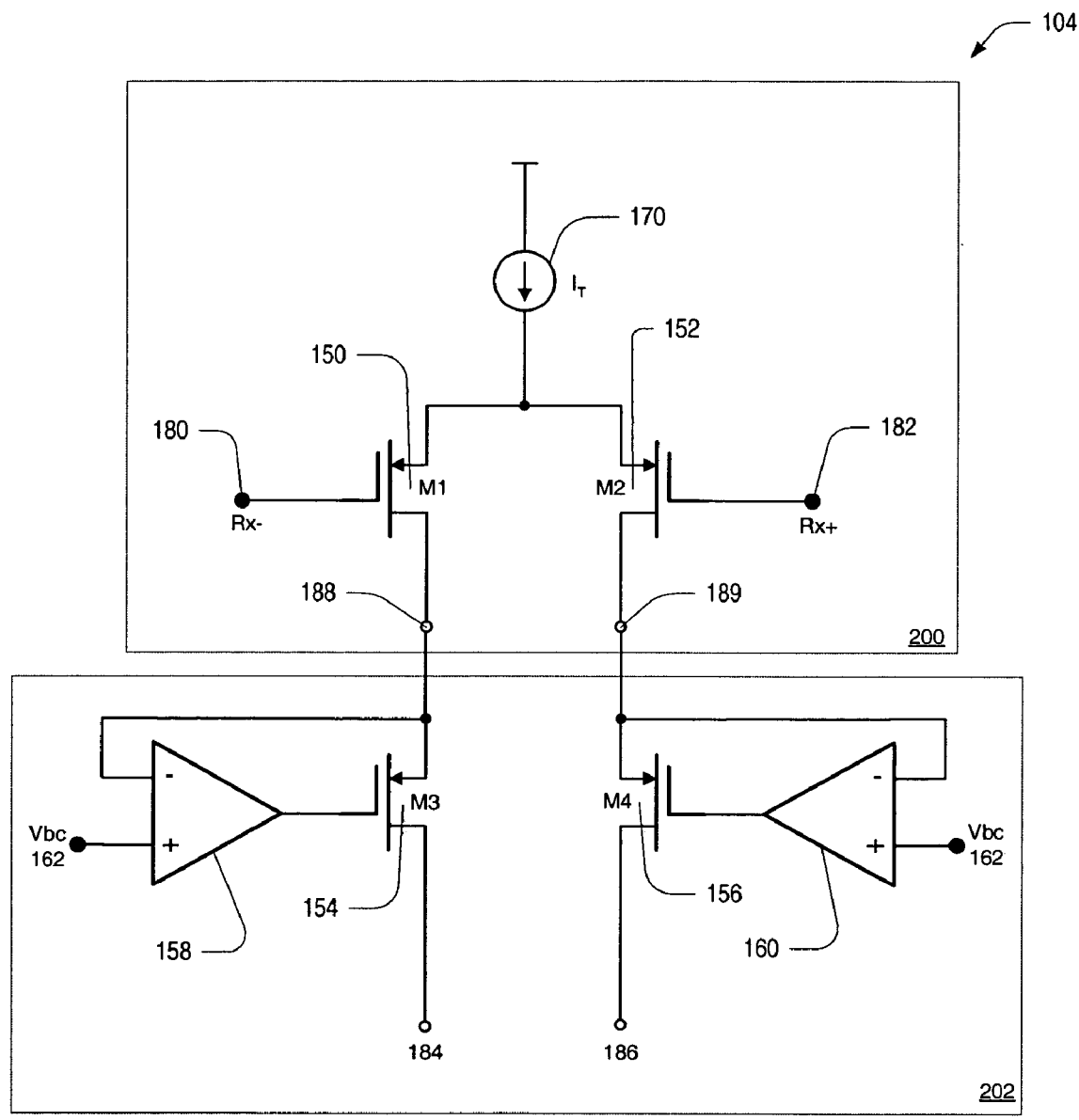
FIG. 2 illustrates a circuit diagram of one embodiment of the transconductor and active cascode stage.

One embodiment of ITC 104 is shown in FIG. 2. In this embodiment, ITC 104 comprises a basic transconductor stage (TS) 200 coupled to a very low input impedance current cascode stage (CS) 202. TS 200 may be implemented using differential transistor pair M1 150 and M2 152, with current source 170 providing current to the source-terminal of M1 150 and to the source-terminal of M2 152. Differential input signals Rx– 180 and Rx+ 182 may be provided to the gate-terminals of M1 150 and M2 152, respectively. CS 202 may be constructed with common source transistors M3 154 and M4 156, each configured in a feedback loop to minimize the input impedance at the respective drain-terminals of M1 150 and M2 152, which also comprise the inputs to CS 202. M3 154 and M4 156 may be coupled to node 188 and 189, respectively, in an active cascade configuration as shown. The feedback loop for M3 154 may be implemented by coupling its source-terminal to the inverting input of amplifier 158, and providing a source reference voltage Vbc 162 to the non-inverting terminal of amplifier 158. Similarly, the feedback loop for M4 156 may be implemented by coupling its source-terminal to the inverting input of amplifier 160, and providing source reference voltage Vbc 162 to the non-inverting terminal of amplifier 160.

In the embodiment shown in FIG. 2, the source-terminals of M3 154 and M4 156 act as a virtual ground, effectively lowering the input impedance that would otherwise be observed at TS 200 output terminals 188 and 189. CS 202 also operates to effectively eliminate band limiting at output terminals 188 and 189, and reduce signal loss that may be affected by TS 200 due to finite output impedance. In this manner, CS 202 provides effective bandwidth extension and allows for weak inversion operation of input transistor pair M1 150 and M2 152, not normally possible due to bandwidth limitation. In one set of embodiments, coupling CS 202 to TS 200 allows for differential pair M1 150 and M2 152 to be used in a high frequency application when biased in weak inversion. Furthermore, by keeping the respective non-inverting inputs of amplifiers 158 and 160 at reference voltage Vbc, outputs of TS 200 may be held substantially constant, thus substantially reducing or eliminating the Miller effect that may arise as a result of the presence of parasitic capacitances. Overall, high impedance output of TS 200 (across output nodes 188 and 189) may be connected to very low input impedance CS 202, which may operate to isolate the RF input from any voltage changes seen due to the down conversion mixer stage (mixers 106, 100 and 112), in order to minimize self-mixing with the input signal, originally at input nodes 180 and 182. A fully differential topology, as shown in FIG. 2, may lead to substantially reduced voltage perturbations.

Figure 3:
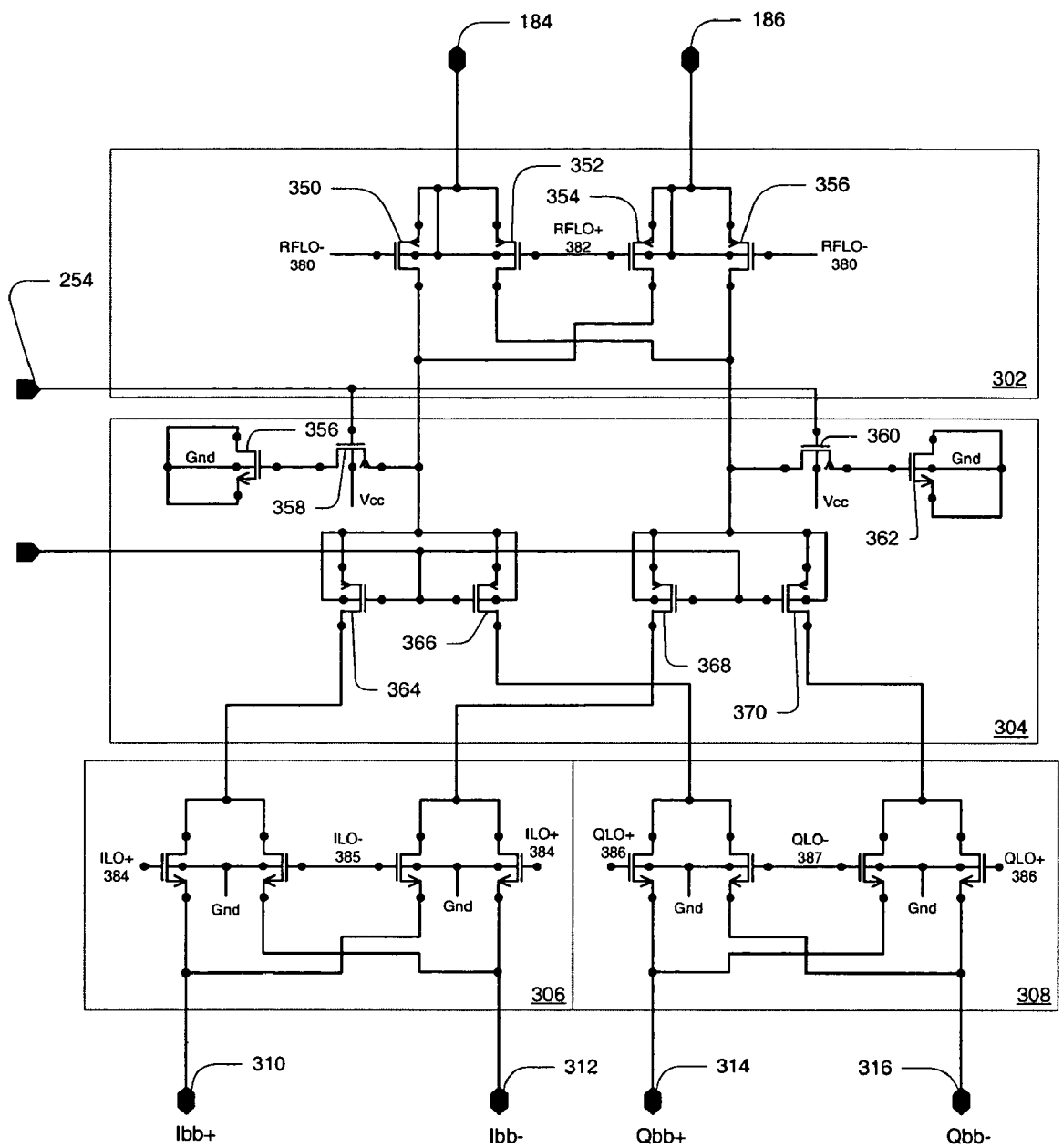
FIG. 3 illustrates a transistor diagram of one embodiment of the intermediate mixer, intermediate filter and current splitter, and quadrature mixers.

For the current-mode signal provided at output terminals 184 and 186 by ITC 104, mixers 106, 110 and 112 may be constructed using simple single transistor switches ideal for CMOS implementations. In one embodiment, each one of mixers 106, 100 and 112 is implemented using four NMOS switches, which can be driven with CMOS logic level signals from a phase-locked loop (PLL) with quadrature outputs. FIG. 3 illustrates the transistor circuits implementing mixers 106, 110, and 112 and IFC 108 according to one embodiment of the present invention. Transistor circuit 302 corresponds to mixer 106 with differential current inputs 184 and 186 provided to the source-terminals of transistors 350, 352, 354, and 356 comprised in circuit 302 as shown. Differential inputs RFLO– 380 and RFLO+ 382 may originate from a local oscillator, and may correspond to frequency input F1 of mixer 106 in FIG. 1. The output from circuit 302 is provided to transistor circuit 304 comprising transistors 356, 358, 360, and 362, which correspond to the filter portion of IFC 108, with IFC 108 enable signal 254 (from FIG. 1) indicated as shown. The output of the filter portion of IFC 108 is then input to transistors 364, 366, 368 and 370, also comprised in circuit 304, which together operate as a current splitter to provide four current-output signals, two current-output signals each respectively to transistor circuit 306 corresponding to I mixer 110 (from FIG. 1), and to transistor circuit 308 corresponding to Q mixer 112. Differential inputs ILO– 385 and ILO+ 384 of mixer 306 may originate from a local oscillator, and may correspond to frequency input F2 of mixer 110 in FIG. 1. Similarly, differential inputs QLO– 387 and QLO+ 386 of mixer 308 may also originate from a local oscillator, and may correspond to frequency input F2 of mixer 110 in FIG. 1. Outputs 310 and 312 represent current-mode differential outputs of the I channel while outputs 314 and 316 represent current-mode differential outputs of the Q channel. In one embodiment, outputs 310 and 312 are provided to TRF 114, and outputs 314, and 316 are provided to TRF 116, as illustrated in FIG. 1, to reconstruct the modulated signal in voltage-mode at low frequency.

TRF 114 and TRF 116 may be designed as demonstrated in U.S. application Ser. No. 10/341,158 titled "Baseband Filter For Receivers" filed on Jan. 13, 2003, invented by Troy L. Stockstad and Klaas Wortel, and which is hereby incorporated by reference as though fully and completely set forth herein.

Figure 4:
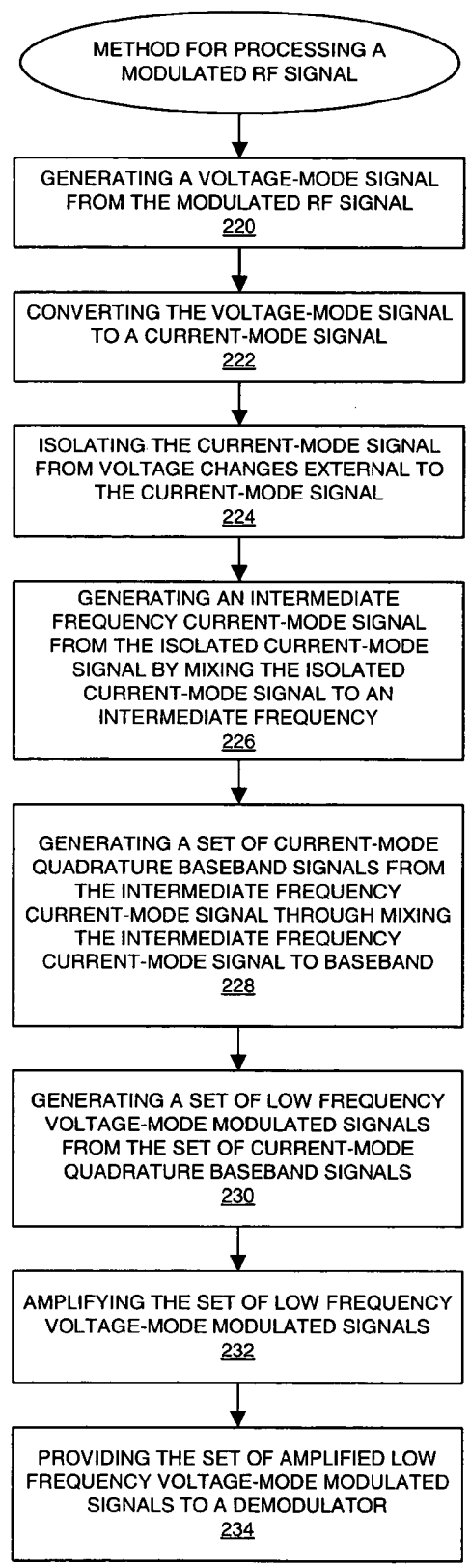
FIG. 4 illustrates a flowchart of one embodiment of a method for processing a modulated RF signal.

FIG. 4 illustrates a flowchart of one embodiment of a method for processing a modulated RF signal. The modulated RF signal may be received by an antenna, which may generate a voltage-mode signal from the modulated RF signal and provide the voltage-mode signal to a receiver (220). The receiver may convert the voltage-mode signal to a current-mode signal (222) and isolate the current-mode signal from voltage changes external to the current-mode signal, such as voltage changes appearing due to a downconversion mixer that may be used in the receiver. In one embodiment, an intermediate current-mode baseband signal is generated from the isolated current-mode signal by mixing the isolated current-mode signal to an intermediate frequency (226). The frequency used in mixing to the intermediate frequency may be provided by a local oscillator. A set of current-mode quadrature baseband signals may be generated from the intermediate frequency current-mode signal through mixing the intermediate frequency current-mode signal to baseband (228), where a local oscillator may also provide the frequency used to mix to baseband. The set of current-mode quadrature baseband signals may then be converted to a set of low frequency voltage-mode modulated signals (230). In one embodiment, a baseband filter performs the conversion. The set of low frequency voltage-mode modulated signals may be amplified (232) and provided to a demodulator to obtain the desired information (234).

Thus, various embodiments of the systems and methods described above may facilitate design of a current-mode direct conversion RF receiver with minimal self-mixing effects, minimal DC offset in the baseband signal, and low operating voltage levels.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A current-mode direct conversion receiver comprising:
   an input voltage-to-current converter stage;
   a downconversion mixer coupled to the input voltage-to-current stage;
   a current-to-voltage filter stage coupled to the downconversion mixer; and
   an active correction stage coupled between the input voltage-to-current converter stage and the downconversion mixer;
   wherein the input voltage-to-current converter stage is operable to receive a voltage-mode modulated RF signal and from the voltage-mode modulated RF signal generate a current-mode modulated RF signal;
   wherein the active correction stage is operable to isolate the current-mode modulated RF signal from voltage changes due to the downconversion mixer;
   wherein the downconversion mixer is operable to generate current-mode quadrature baseband signals through mixing the current-mode modulated RF signal to baseband at an operating frequency; and
   wherein the current-to-voltage filter stage is operable to generate from the current-mode quadrature baseband signals voltage-mode modulated signals corresponding to the voltage-mode modulated RF signal.

2. The system of claim 1, wherein the current-to-voltage filter stage is further operable to provide the low frequency voltage-mode modulated signals to a demodulator.

3. The system of claim 1, wherein the voltage-mode modulated signals comprise low frequency voltage-mode modulated signals.

4. The receiver of claim 1, wherein the active correction stage is configured to minimize input impedance at its inputs.

5. The receiver of claim 1, wherein the active correction stage comprises a current cascode stage.

6. The receiver of claim 5, wherein the current cascode stage comprises common source transistors configured in a feedback loop.

7. The receiver of claim 1 further comprising an antenna coupled to the input voltage-to-current converter stage, wherein the antenna is operable to receive modulated RF signals and to generate the voltage-mode modulated RF signal from a received modulated RF signal.

8. The receiver of claim 1, wherein a primary mixing frequency used in mixing the current-mode modulated RF signal to baseband at the operating frequency is provided by a local oscillator.

9. The receiver of claim 1 further comprising an additional mixer coupled between the input voltage-to-current converter stage and the downconversion mixer, wherein the additional mixer is operable to reduce self-mixing at the downconversion mixer and to reduce DC voltage offset at the quadrature baseband current signals.

10. The receiver of claim 1 further comprising a limiter amplifier stage coupled to the current-to-voltage filter stage, wherein the limiter amplifier stage is operable to amplify the low frequency voltage-mode modulated RF signals to saturate against a supply voltage and a common ground.

11. The receiver of claim 10, wherein the limiter amplifier stage is further operable to provide the amplified low frequency voltage-mode modulated signals to a demodulator.

12. The receiver of claim 1, wherein the current-to-voltage filter stage is operable to remove unwanted signals in adjacent channels comprised in a system comprising the receiver.

13. The receiver of claim 1, wherein the input voltage-to-current converter stage comprises a transconductance amplifier.

14. The receiver of claim 1, wherein the downconversion mixer comprises simple single transistor switches.

15. The receiver of claim 14, wherein the transistor switches are NMOS switches driven with CMOS logic level signals from a phase locked loop.

16. A method for processing a modulated RF signal, the method comprising:
    generating a current-mode signal from the modulated RF signal;
    isolating the current-mode signal from voltage changes external to the current-mode signal;
    generating a set of current-mode quadrature baseband signals based on the isolated current-mode signal; wherein the set of current-mode quadrature baseband signals has an operating frequency; and
    generating from the set of current-mode quadrature baseband signals a set of low frequency voltage-mode modulated signals corresponding to the modulated RF signal.

17. The method of claim 16, further comprising generating an intermediate frequency current-mode signal from the isolated current-mode signal by mixing the isolated current-mode signal to an intermediate frequency.

18. The method of claim 17, wherein said generating the set of current-mode quadrature baseband signals comprises mixing the intermediate frequency current-mode signal to baseband at the operating frequency.

19. The method of claim 18, wherein frequencies used in mixing to baseband at the operating frequency and in mixing to the intermediate frequency are provided by one or more local oscillators.

20. The method of claim 16, further comprising providing the set of low frequency voltage-mode modulated signals to a demodulator.

21. The method of claim 16, further comprising amplifying the set of low frequency voltage-mode modulated signals to saturate against a supply voltage and a common ground.

22. The method of claim 21, further comprising providing the set of amplified low frequency voltage-mode modulated signals to a demodulator.

23. The method of claim 16, further comprising generating an intermediate frequency current-mode signal from the current-mode signal by mixing the current-mode signal to an intermediate frequency.

24. The method of claim 23, wherein said generating the set of current-mode quadrature baseband signals comprises mixing the intermediate frequency current-mode signal to baseband at the operating frequency.

25. The method of claim 24, wherein frequencies used in mixing to baseband at the operating frequency and in mixing to the intermediate frequency are provided by one or more local oscillators.

26. A current-mode direct conversion receiver comprising:
    an input transconductor;
    a current cascode stage coupled to the input transconductor;
    a downconversion mixer coupled to the current cascode stage; and
    a baseband filter coupled to the downconversion mixer;

wherein the input transconductor is operable to receive a voltage-mode modulated RF signal and generate a current-mode modulated signal from the voltage-mode modulated RF signal;

wherein the current cascode stage is operable to isolate the current-mode modulated signal from voltage changes not occurring within the current-mode modulated signal;

wherein the downconversion mixer is operable to generate a set of current-mode quadrature baseband signals through mixing the isolated current-mode modulated RF signal to baseband at an operating frequency; and wherein the baseband filter is operable to generate from the current-mode quadrature baseband signals low frequency voltage-mode modulated signals corresponding to the voltage-mode modulated RF signal, and to provide the low frequency voltage-mode modulated signals to a demodulator.

27. The receiver of claim 26 further comprising an antenna coupled to the input transconductor, wherein the antenna is operable to receive modulated RF signals and to generate the voltage-mode modulated RF signal from a received modulated RF signal.

28. The receiver of claim 26, wherein a primary mixing frequency used in mixing the isolated current-mode modulated RF signal to baseband at the operating frequency is provided by a local oscillator.

29. The receiver of claim 28 further comprising an intermediate mixer coupled between the input transconductor and the downconversion mixer, wherein the intermediate mixer is operable to mix the isolated current-mode modulated RF signal to an intermediate frequency.

30. The receiver of claim 26, wherein the current cascode stage is configured to minimize input impedance at its inputs.

31. The receiver of claim 26 further comprising a limiter amplifier coupled to the baseband filter, wherein the limiter amplifier is operable to amplify the low frequency voltage-mode modulated signals to saturate against a supply voltage and a common ground.

32. The receiver of claim 31, wherein the limiter amplifier is further operable to provide the amplified low frequency voltage-mode modulated signals to a demodulator.

33. The receiver of claim 26, wherein the baseband filter is operable to remove unwanted signals in adjacent channels comprised in a system comprising the receiver.

34. The receiver of claim 26, wherein the current cascode stage comprises common source transistors configured in a feedback loop.

35. The receiver of claim 26, wherein the downconversion mixer comprises simple single transistor switches.

36. The receiver of claim 35, wherein the transistor switches are NMOS switches driven with CMOS logic level signals from a phase locked loop.

* * * * *